(12) United States Patent
Clinch et al.

(10) Patent No.: US 9,700,846 B2
(45) Date of Patent: Jul. 11, 2017

(54) FLUID PURIFICATION DEVICE WITH FLEXIBLE HOUSING

(71) Applicant: Rorus Inc., Pittsburgh, PA (US)

(72) Inventors: Corinne Clinch, Pittsburgh, PA (US); Uriel Eisen, Pittsburgh, PA (US)

(73) Assignee: Rorus Inc., Pittsburgh, PA (US)

( * ) Notice: Subject to any disclaimer, the term of this patent is extended or adjusted under 35 U.S.C. 154(b) by 5 days.

(21) Appl. No.: 14/958,546

(22) Filed: Dec. 3, 2015

(65) Prior Publication Data

US 2016/0159662 A1   Jun. 9, 2016

Related U.S. Application Data

(60) Provisional application No. 62/088,156, filed on Dec. 5, 2014.

(51) Int. Cl.
| | |
|---|---|
| *B01D 63/08* | (2006.01) |
| *B01D 63/02* | (2006.01) |
| *C02F 1/50* | (2006.01) |
| *C02F 1/68* | (2006.01) |
| *C02F 1/28* | (2006.01) |

(Continued)

(52) U.S. Cl.
CPC .......... *B01D 63/081* (2013.01); *B01D 35/16* (2013.01); *B01D 63/021* (2013.01); *C02F 1/002* (2013.01);

(Continued)

(58) Field of Classification Search
CPC ........ B01D 23/04; B01D 35/34; B01D 35/30; B01D 24/042; B01D 29/0029;

(Continued)

(56) References Cited

U.S. PATENT DOCUMENTS 3,335,917 A * 8/1967 Sutherland ................ A45F 3/16
                                                    210/453
3,744,639 A * 7/1973 Teeple, Jr. ............. B01D 23/04
                                                    210/265

(Continued)

FOREIGN PATENT DOCUMENTS

FR       2814080 A1 *  3/2002  .......... A61M 1/0272

OTHER PUBLICATIONS

FR 2814080 machine translation with original text.*

(Continued)

*Primary Examiner* — David C Mellon
*Assistant Examiner* — Liam Royce
(74) *Attorney, Agent, or Firm* — Crowell & Moring LLP (57) ABSTRACT

A filtration device includes a holding portion having opposed flexible sides with first and second ends, and a filter having an axis corresponding approximately to an edge of the filter, where the axis is coplanar with a planar surface of the filter. The filter may be arranged between the opposed flexible sides, and the filter may be configured to rotate about the axis such that an angle is formed between the planar surface and one of the opposed flexible sides. The filter may be configured to divide the holding portion into first and second holding parts, where the first holding part and the second holding part may be configured to hold fluid received from the first end of the holding portion and filtrate corresponding to the fluid having passed through the filter, respectively. The filtrate may be configured to exit from an opening at the second end.

26 Claims, 6 Drawing Sheets

(51) Int. Cl.
*C02F 1/00* (2006.01)
*C02F 1/44* (2006.01)
*B01D 29/27* (2006.01)
*B01D 35/16* (2006.01)

(52) U.S. Cl.
CPC ............... *C02F 1/283* (2013.01); *C02F 1/44* (2013.01); *C02F 1/505* (2013.01); *C02F 1/68* (2013.01); *B01D 23/04* (2013.01); *B01D 2313/12* (2013.01); *B01D 2313/54* (2013.01); *C02F 1/003* (2013.01); *C02F 2303/04* (2013.01); *C02F 2307/02* (2013.01); *Y02W 10/37* (2015.05)

(58) Field of Classification Search
CPC ......................... B01D 63/08; B01D 2201/309; B01D 63/081; B01D 63/021; B01D 24/32; B01D 33/15; B01D 33/41; B01D 35/16; B01D 2313/54; B01D 2313/12; C02F 1/002; C02F 1/505; C02F 1/68; C02F 1/283; C02F 1/44; C02F 2303/04; C02F 2307/02; C02F 1/003; B01L 3/50–3/502; A61M 1/3636; A61M 1/0218; Y02W 10/37
See application file for complete search history.

(56) References Cited

U.S. PATENT DOCUMENTS

| | | | | |
|---|---|---|---|---|
| 4,035,304 | A | * | 7/1977 | Watanabe ............ A61M 1/3633 210/317 |
| 4,564,452 | A | * | 1/1986 | Sharpe .................... C02F 1/002 210/489 |
| 5,200,073 | A | * | 4/1993 | Steere .................... B01D 61/18 210/232 |
| 5,928,396 | A | * | 7/1999 | Choi .................. B01D 39/1607 210/487 |
| 6,306,188 | B1 | * | 10/2001 | Karlsson ............ B01D 46/0001 55/381 |
| 7,488,364 | B1 | * | 2/2009 | Thomas ............... B01D 46/103 55/385.1 |
| 9,038,830 | B2 | * | 5/2015 | Lucas .................... B01D 25/26 210/493.1 |

OTHER PUBLICATIONS

T. A. Dankovich, "Microwave-assisted incorporation of silver nanoparticles in paper for point-of-use water purification," Royal Society of Chemistry, Environ. Sci.: Nano, 2014, vol. 1, pp. 367-378.

* cited by examiner

FIG. 2A​    FIG. 2B though various features may be shown only in connection with certain embodiments, such features may be combined with one or more other features of other embodiments.

FLUID PURIFICATION DEVICE WITH FLEXIBLE HOUSING

CROSS REFERENCE TO RELATED APPLICATIONS

This application claims the benefit of U.S. Provisional Application No. 62/088,156, filed Dec. 5, 2014, the contents of which are incorporated herein by reference in its entirety.

BACKGROUND OF THE INVENTION

Clean drinking water is a necessity of life. Access to clean drinking water, however, can be extremely difficult and sometimes impossible in various settings, situations, and/or circumstances. For example, water found in developing countries may often be dirty, microbe-infested, and unsafe to consume. In another example, military personnel and/or recreationists may run out of water in unfamiliar terrain and may have to rely on water from natural sources, such as streams, ponds, lakes, rivers, which may also be dirty, microbe-infested and unsafe to consume. In a further example, various types of contaminations in water supplies may cause significant shortages of clean drinking water for cities, towns, municipalities, and the like, in a short period of time. In yet another example, natural disasters, such as floods, hurricanes, tsunamis, etc. may render access to clean drinking water extremely difficult immediately after the disaster event. In the above-examples, there is a need for immediate access to and/or consumption of clean drinking water.

One way to meet this need is by way of storing and transporting clean drinking water in vast quantities. After a natural disaster, for instance, large quantities of bottled water are typically shipped to the disaster site. Doing so, however, can be very expensive and time consuming. Moreover, numerous packages of bottled water inherently require large physical spaces for storage in warehouses and transportation in trucks. And in most cases, disaster sites may not receive shipments of bottled water until several days after the disaster event, which contributes to overall devastation. In addition, disposal of bottled water may also pose additional problems, such as pollution in or around the disaster site and harm to the environment.

Another way to meet the need for clean drinking water is by way of purification. Water may be purified in different ways, for example, chemically (e.g., chlorination), physically (e.g., filtration), thermally (e.g., fire, heat), UV light (e.g., sunlight), and flocculation. However, all of these purification techniques have various limitations.

For example, devices that use solar disinfection or boil water are neither easy to ship nor fast to use. Moreover, the addition of chemicals into water via chlorination or flocculation may pose safety issues and/or life threatening risks if improperly used. Moreover, most microfiltration devices are neither cost-effective nor safe according to WHO and EPA guidelines. Most microfiltration devices require vertical head pressure above the filter to create clean water. To create this pressure in a small portable system, most of these devices have storage areas connected to a filter through a long piece of plastic tube. The use of many detachable components in these microfiltration devices render them expensive, bulky, and susceptible to contamination.

In that regard, a fluid purification device and/or method that is cost effective, space-efficient, and safe is needed.

SUMMARY OF THE INVENTION

The invention relates to a device and method for fluid purification. In particular, a device and method for fluid purification, such as a filtration device, that is affordable, space-efficient, and safe is provided.

In one aspect of the invention, a filtration device may include a holding portion having opposed flexible sides and a first end and a second end; and a filter having an axis corresponding approximately to an edge of the filter, wherein the axis is coplanar with a planar surface of the filter. The filter may be arranged between the opposed flexible sides of the holding portion, and the filter may be configured to rotate about the axis such that an angle is formed between the planar surface of the filter and one of the opposed flexible sides of the holding portion. Moreover, the filter may be configured to divide the holding portion into a first holding part and a second holding part, wherein the first holding part may be configured to hold fluid received from the first end of the holding portion, and the second holding part may be configured to hold filtrate corresponding to the fluid having passed through the filter. The filtrate may be configured to exit from an opening at the second end of the holding portion.

In a further aspect of the invention, a filtration device includes a holding portion having opposed flexible sides and a first end and a second end and a filter having an axis corresponding approximately to an edge of the filter, wherein the filter is coplanar with a planar surface of the filter. The filter may be arranged between the opposed flexible sides of the holding portion. The filtration device may be configured to be in an operating position or in a collapsed position. The operating position configures the filter to rotate about the axis such that an angle is formed between the planar surface of the filter and one of the opposed flexible sides of the holding portion, the filter to divide the holding portion into a first holding part and a second holding part, the first holding part to hold fluid received from the first end of the holding portion, and the second holding part to hold filtrate, wherein the filtrate is configured to exit from an opening at the second end of the holding portion. The collapsed position configures the angle between the planar surface of the filter and the one of the opposed flexible sides of the holding portion to be approximately zero such that the filter and the one of the opposed flexible sides are made approximately flat.

A method for fluid filtration includes receiving fluid from a first end of the holding portion and passing the fluid through a filter. The method also includes producing filtrate via the fluid having passed through the filter and collecting the filtrate. Moreover, the method includes permitting the filtrate to exit from a second end of the holding portion. The holding portion may have opposed flexible sides, and the filter may have an axis corresponding approximately to an edge of the filter, wherein the axis is coplanar with a planar surface of the filter. The filter may be arranged between the opposed flexible sides of the holding portion. The filter may rotate about the axis such that an angle is formed between the planar surface of the filter and one of the opposed flexible sides of the holding portion, and may divide the holding portion into a first holding part and as second holding part, wherein the fluid may be received into the first holding part of the holding portion, and wherein the filtrate may be collected into the second holding part of the holding portion.

Other objects, advantages and novel features of the present invention will become apparent from the following detailed description of one or more preferred embodiments when considered in conjunction with the accompanying drawings. It should be recognized that the one or more examples in the disclosure are non-limiting examples and that the present invention is intended to encompass variations and equivalents of these examples. The disclosure is written for those skilled in the art. Although the disclosure use terminology and acronyms that may not be familiar to the layperson, those skilled in the art will be familiar with the terminology and acronyms used herein.

DETAILED DESCRIPTION OF THE INVENTION

The present disclosure directed to a device and method for fluid purification that is cost-effective, space-efficient, and safe. For example, a filtration device may be a single, continuous, and/or compact unit. The filtration device may be configured to be in an operating position, a collapsed position, or a folded position. In the operating position, the filtration device is configured to receive dirty, unfiltered fluid at one end and further configured to provide clean drinking water at the other end. The filtrate may sufficiently meet various purification standards, such as the WHO and EPA standards. The filtration device may be in the collapsed position, if the device is unused, unfilled with fluid, transported, shipped, carried, stored, etc. In the collapsed position, the filtration device is configured to collapse into a flat manner. From the collapsed position, the filtration device may be then folded (e.g., folded position) one or more times into a space and weight efficient size for easy shipment and/or portability.

The above-advantages of the filtration device disclosed herein are realized by the descriptions and discussions set forth below with respect to the various aspects, examples, embodiments and/or the figures in accordance with the disclosure.

FIG. 1 illustrates a perspective view of a filtration device 100 according to one or more aspects of the disclosure. By way of example only, the filtration device 100 may include a holding portion 115 having a top end 141 and a bottom end 142 in the form of a rectangular plastic bag formed from two rectangles (or other shapes), or one folded rectangle, of flexible membrane material that may be sealed together about its periphery using, for example, a plastic weld, heat seal, and/or adhesive. In another example, the holding portion 115 may be formed from a tubular sheet material and/or tubular sheet material with no side seals. Moreover, the filtration device 100 includes a filter 101 arranged in the holding portion, which divides the holding portion into two parts: a first chamber 110 and a second chamber 120. In this example, the filtration device 100 is configured to receive fluid, such as dirty un-filtered fluid, from the top end of the first chamber 110. Then, the fluid passes through the filter 101 and flows into the second chamber 120. The fluid received by the second chamber 120 is clean, filtrate produced by the filtering process. Subsequently, the filtrate may be dispensed from one or more openings at the opposite end of the second chamber 120. Optionally, the filtrate may be dispensed with the aid of a dispensing portion 130.

Figure 1A:
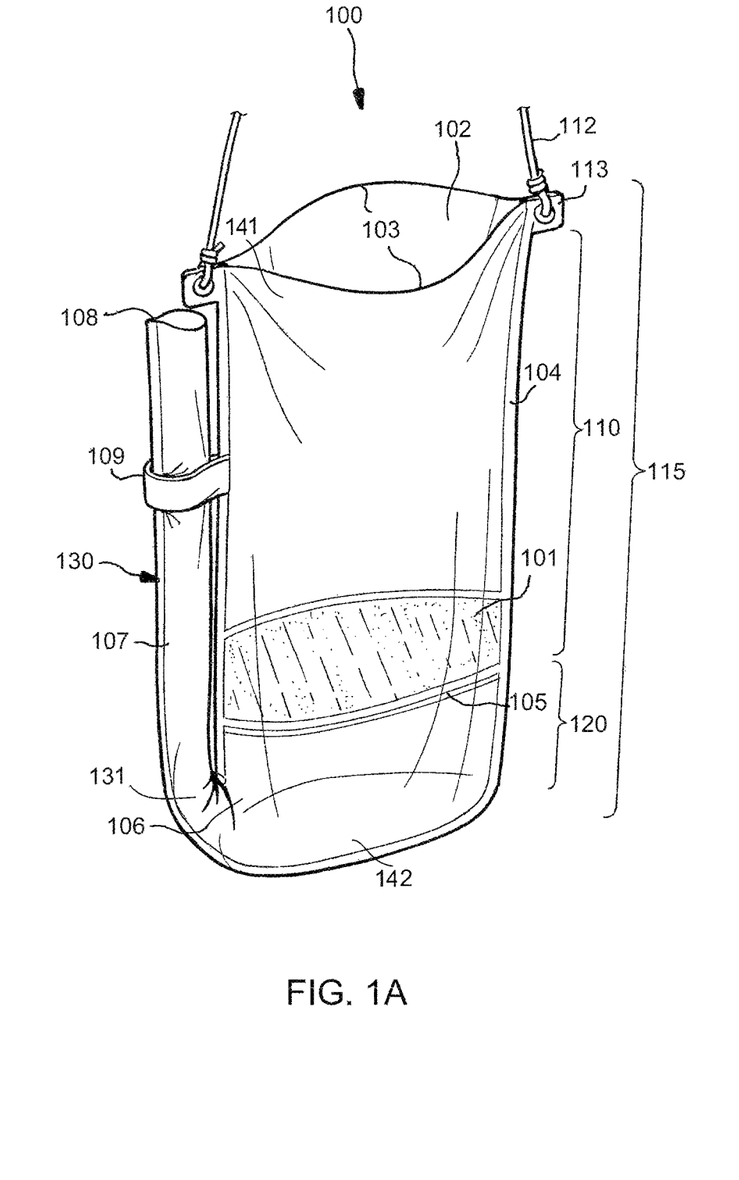
FIG. 1A illustrates a perspective view of a filtration device in accordance with one or more aspects of the present disclosure.

As illustrated in FIG. 1A, at least the first chamber 110 and the second chamber 120 of the holding portion, the filter 101, and the dispensing end 108 are configured as one collective unit approximately contained by and/or within the overall shape of the holding portion. In that regard, the filtration device 100 is space-efficient because it at least obviates the need for lengthy tube connections, external filter attachments, etc. found in most microfiltration devices. Additionally, because the holding portion of the filtration device 100 and other portions thereof may be made from flexible, collapsible, light, durable, and/or waterproof material, the filtration device may be made even more space-efficient by rendering it foldable.

It should be understood by those of ordinary skill that the shape of the holding portion, when open and receiving fluid, may be any kind of shape, including but not limited to a cylindrical-shape, a tube shape, an oval-shape, a rectangular-shape, a trapezoidal-shape, or any other shape that can be configured to receive and retain fluid and that can be configured to fold. In one example, the height of the holding portion may be approximately 44 centimeters and the width of the holding portion may be approximately 22.5 centimeters, or any combination of measurements in which the height is approximately half of the width of the holding portion. Other proportionate dimensions of the tank are within the scope of this disclosure. Moreover, it may be understood that the flexibility of the holding portion may vary depending on temperature, such as the temperature of the fluid in the holding portion, the temperature of the environment, etc.

First and Second Chambers

As discussed above, the holding portion of the filtration device 100 includes the first chamber 110 and the second chamber 120. These chambers are compartments formed within an internal cavity of the holding portion, each of which may be considered to be a fluid receiving section, and that are connected to each other for example, using a plastic weld or adhesive (or in some instances, no weld when formed from a tubular sheet material for example). The first chamber 110 (e.g., fluid receiving section) may be in fluid communication with the second chamber 120 (e.g., filtrate storage section). The fluid communication may occurs via the filter 101 disposed between the first chamber 110 and the second chamber 120.

As shown in FIG. 1A, the first chamber 110 includes an opening 102 formed by one or more opposed sidewalls 103 attached to each other via one or more lateral seams 104 (or in some instances, no seams when formed from a tubular sheet material for example). In this example, the first chamber 110 may be arranged above the filter 101 and is considered an upper chamber. The second chamber 120 may be arranged below the filter 101 and may be considered a lower chamber so that it receives fluid passing through the filter 101 by force of gravity or by pressure differential. However, it is understood that other configurations, such as side-by-side configurations of the first and second chambers may be realized.

The first chamber 110 and the second chamber 120 may be made of flexible, foldable plastic sheet material. By way of example only, the thickness of the flexible plastic sheet material may be between 5 micrometers to 50 micrometers. Other thicknesses are also possible. Examples of suitable plastic sheet material for the first chamber 110 and the second chamber 120 may include Biaxial Oriented Polypropylene, HDPE (high density polyethylene), Cast Polypropylene, Biaxial PET (oriented polyester), LDPE (low density polyethylene), EVOH (ethylene vinyl alcohol), OPS (oriented polystyrene), Biaxial Nylon 6, Poly vinyl chloride (PVC), High Impact Polystyrene (HIPS), Styrene Maleic Anhydride (SMA), Acrylonitrile Butadiene Styrene (ABS), Polypropylene (PP), Polycarbonate (PC) and laminates thereof.

Other sheet materials having desired flexibility and other characteristics may be used for the first chamber 110, the second chamber 120, and other parts/portions of the filtration device 100. Examples of desired characteristics may include: easy sealability, strength, transparency, resistance to disinfecting agents, resistance to UV degradation, sunlight permeability, and/or food-grade quality. For example, the strength of the sheet material may be such that it is capable of maintaining mechanical integrity while holding a capacity of up to 10 liters of fluid. In another example, the strength of the sheet material may also be capable of maintaining mechanical integrity even while being physically distressed during transit and/or shipment.

For instance, the sheet material may itself be treated using known methods to prevent the growth of microorganisms on the sheet material. For example, the sheet material may be made of a food grade material. Examples of suitable food grade plastic sheet materials include polyolefins, Poly vinyl chloride (PVC), High Impact Polystyrene (HIPS), polyethylene (PE), polypropylene (PP), polyesters (PET, PEN, PC), ionomers, ethylene vinyl acetate (EVA), polyamides (PA), polyvinyl chloride (PVC), polyvinylidene chloride (PVdC), polystyrene (PS), styrene butadiene (SB), acrylonitrile butadiene styrene (ABS), ethylene vinyl alcohol (EVOH), polymethyl pentene (TPX), high nitrile polymers (HNP), fluoropolymers (PCTFE/PTFE), cellulose-based materials, polyvinyl acetate (PVA) and laminates thereof.

In another instance, the sheet material is heat sealable. Heat sealing may be done to create the chambers and to seal various parts of the filtration unit to the sheet material. In an embodiment, multilayer laminate sheet with a suitable tie layer that binds the two different materials may also be used. Examples of the suitable plastic sheet material may include multilayer laminate of PE and PET, monolayer PVC.

In a further instance, the sheet material may be resistant to disinfection agents that may be added to the filtration unit. This feature is especially relevant to the chambers in contact with the fluid dissolved with the disinfecting agent. Suitable agents may be added to other materials to provide this chemical resistance.

Moreover, the sheet material may have a level of transparency that may be selected based on the needs of a user. Transparency of the sheet material may be altered by blending in colorants. The colorants may further block specific wavelengths of light and may prevent the growth of algae or other microorganisms on the plastic sheet material. In one example, the transparency of the sheet material may vary within the filtration unit. For example, portions of the filtration device 100 may be transparent to see the fluid inside in either the first chamber 110 or the second chamber 120. The transparent portions may enable a user to see the level of fluid or level of accumulated sedimentation inside the various chambers. Transparency features may also help the user determine when the filter needs to be replaced.

In some examples, the volume of the first chamber 110 may be between 1 liter and 4 liters, e.g., 3 liters. Other volumes are within the scope of this disclosure. The volume of the second chamber 120 may be, in some examples, between 0.3 and 1 liter, e.g., 0.5 liter (volume of fluid drinkable at a time) in order to prevent recontamination in an accumulation of stale fluid. In certain other examples, the volume of the second chamber 120 may be approximately 25%, between 10% and 40%, or between 20% and 30% of the volume of the first chamber 110. It should be understood that other sizes are also possible.

Filter

In the example shown in FIG. 1A, the filter 101 may be disposed between the sidewalls 103 of the holding portion of the filtration device 100. The filter 101 may be heat sealed onto the sidewalls 103 so that a waterproof seal is created. In other examples, flexible membranes may couple each end of the filter to a respective sidewall. In that regard, the filter 101 divides the holding portion into the first chamber 110 and the second chamber 120, where the filter 101 forms the bottom part of the first chamber 110 and the top part of the second chamber 120. In some examples, an inlet 105 of the second chamber 120 may be in fluid communication with the outlet of the first chamber 110 via the filter 101, such that fluid may flow from the first chamber 110 to the second chamber 120 via the filter 101 through gravity (or by pressure differential) filtration. The shape of the filter 101 may be of any shape, e.g., rectangular, circular, hexagonal, triangular, etc. The filter 101 may have a relatively flat configuration.

According to one example, the filter 101 may be heat sealed to the sidewalls 103 of the holding portion. According to another example, the sidewalls 103 of the holding portion may include receptacles sized to receive the filter 101, such that the filter may be replaceable after use, for example, the filter may be completely remove and replaced and/or layers of the filter may be peeled off when for instance the filter is clogged. The receptacles may be made from any suitable material to provide a watertight but flexible seal, such as plastic. The filter 101 may include a filtration substrate surrounded by a supporting frame. Examples of the supporting frame may include liquid silicon rubber, plastic, or other elastomer. Optionally, the supporting frame may include one or more structural members, such as locking tabs, clips, zippers, or other features that are configured to connect to the receiving area of the sidewalls 103 of the holding portion, this providing a watertight seal when the connecting features of the supporting frame and the receptacle are mated.

According to a further example, the filter 101 may include a filter backing structure (not shown). The filter backing structure may be a webbing, a mesh, or other support structures configured to be disposed underneath the filter substrate which may prevent human hands from contaminating the filtered fluid while replacing the filter substrate. The filter backing structure may further be configured such that the flow of fluids is not obstructed during filtration. In some embodiments, the filter backing structure may provide additional support during filling of the first chamber and/or during filtration. By way of example only, the filter backing structure may be arranged, disposed, and/or configured above the filter substrate. Examples of the filter backing structure may include liquid silicon rubber, plastic, or other elastomer.

The filter 101 may include a substrate impregnated with metal particles (such as blotting paper or cloth impregnated with silver nanoparticles), activated carbon and/or carbon particles, a membrane filter, felt or nonwoven substrate, or combinations thereof. In certain embodiments, the substrate may be made from bleached softwood kraft pulp, ceramic fibers, or polypropylene.

In an example, silver nanoparticles produced by in situ reduction of silver nitrate solution in the cellulosic fibers of a blotting paper sheet may be used as a bactericide in the filter 101. The thickness of the substrate (e.g., blotting paper) may be between approximately 0.4 mm and approximately 0.6 mm. The thickness may be chosen such that the porosity of the base paper may allow microorganisms to come into contact with the biocide (e.g., silver nanoparticles), while limiting the levels of silver in the effluent fluid by attachment of the silver nanoparticles to the fiber surfaces. In that regard, the silver nanoparticles of the filtration substrate may deactivate the bacteria as they percolate through the filter rather than just removing them by size exclusion. In certain embodiments, the pore size of the filtration substrate may be chosen based on the type of filtration. For example, the pore size may be kept large (e.g., 3-40 micron) for allowing a rapid flow by gravity or other pressure source, without the need for pressure or suction. Other suitable fluid filtration substrates may be used without deviating from the scope of the present disclosure.

It should be understood that while the disclosure includes physical filtration means and techniques, other filtrations techniques are within the scope of the disclosure. For example, the holding portion of the filtration device 100 may also include additional and/or separate physical filtration means and/or chemical filtration means such as halide-based biocides, ion-exchange filtration resins, flocculation, and other filtration techniques. The additional physical filtration means and/or chemical filtration means may be disposed as pre-filters within the first chamber 110. In certain other embodiments, the additional physical filtration means and/or chemical filtration means may be disposed within the second chamber 120 as post-filters.

Moreover, it should be understood that "filter" means a structure that removes, negates, inactivates, or mitigates contaminants from a fluid as the fluid flows through the structure. The filter may perform purification actions through filtration, chemical bonding to contaminants, percolation, the oligodynamic effect, or any other process that removes or negates contaminants from the fluid.

Dispensing Portion

Referring again to FIG. 1A, in some examples, the filtration device 100 may include a dispensing portion 130 with a dispensing end 108 and a connection end 131. For example, the connection end 131 of the dispensing portion 130 may be in fluid communication with an outlet 106 (such as an opening, hole, etc.) of the second chamber 120. In that regard, a user may drink the filtered fluid collected in the second chamber 120 via the dispensing end 108 of the dispensing portion 130. The dispensing portion 130 may also include a tubular dispenser 107. While FIG. 1A illustrates one tubular dispenser, the filtration device 100 may include a plurality of dispensers, which may allow different people to drink directly from the same filtration device 100. By way of example only, the tubular dispenser 107 may include a straw. In another example, the dispensing end may include a valve (not shown here). In other examples, the dispensing portion 130 may be separable from the filtration device 100. In certain other embodiments, the dispensing portion 130 and the filtration device 100 may form a single continuous unit and may be inseparable.

In one aspect of the disclosure, the tubular dispenser 107 of the dispensing portion 130 may be attached and secured to the filtration device 100 by way of a connector 109, such as a clip, strap, locking table or other structure that connects an upper portion of the dispensing portion 130 to the outer sidewalls of the holding portion. As shown in FIG. 1A, the tubular dispenser 107 may be flexible and may be held upright along the side of the holding portion such that the dispensing end 108 is towards and/or adjacent to the opening 102 of the filtration device 100.

While FIG. 1A illustrates the dispensing portion 130 arranged on the left side of the filtration device 100, the dispensing portion 130 may be disposed anywhere on the filtration device 100 that will allow the filtrate collected by the second chamber 120 to exit from the filtration device 100.

Support Ties, Strings, and/or Handles

Figure 1B:
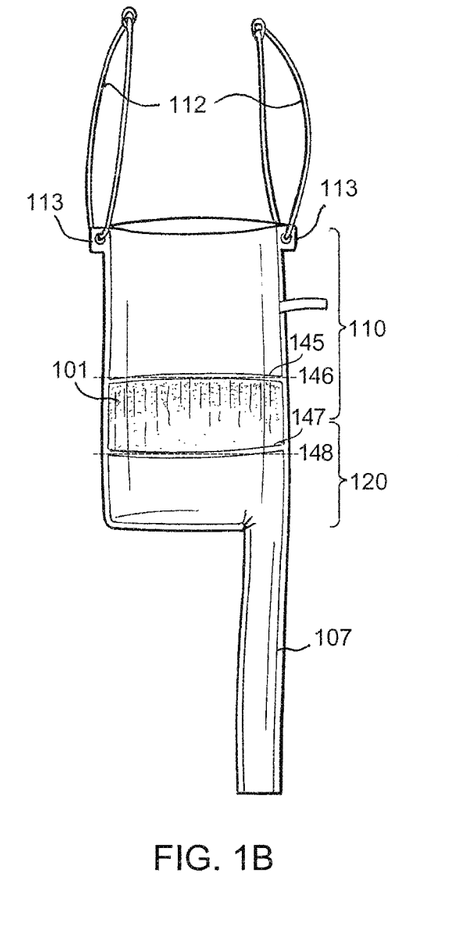
FIG. 1B illustrates a front view of the filtration device in accordance with one or more aspects of the invention.

FIGS. 1A and 1B illustrate the filtration device 100 further including support ties and/or strings 112 attached via through-holes of respective tabs 113. In FIG. 1A, a continuous string 112 is shown where each end is tied and secured to one of the through-holes 113 of the filtration device 100. In FIG. 1B, a separate string is tied and secured to each of the through-holes 113 of the filtration device 100. Moreover, there may be one or more connections or hooks between the two sides of the string. Other configurations of the support ties and/or string with respect to the filtration device 100 may be realized. The device may have handles made from the same material that forms the holding portion. These handles may be made by removing sections of the sheet material to form holes. As such, a user may use the support ties and/or strings 112 to easily carry and transport fluid while the fluid is held in the filtration device 100.

Operating Position

Figure 1C:
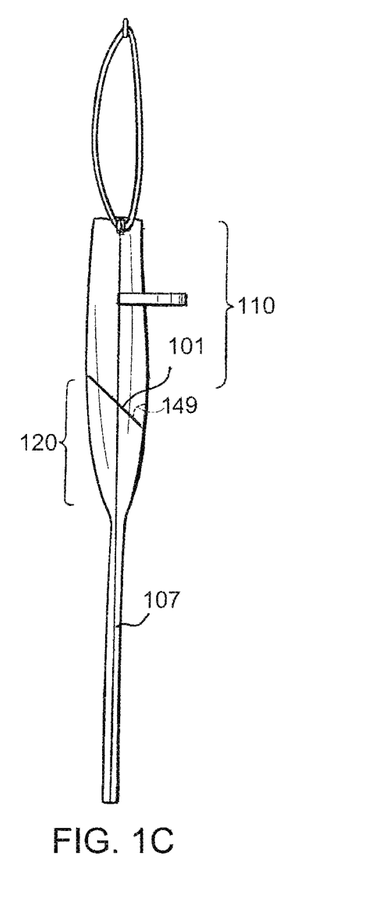
FIG. 1C illustrates a side view of the filtration device according to an embodiment.
Figure 1D:
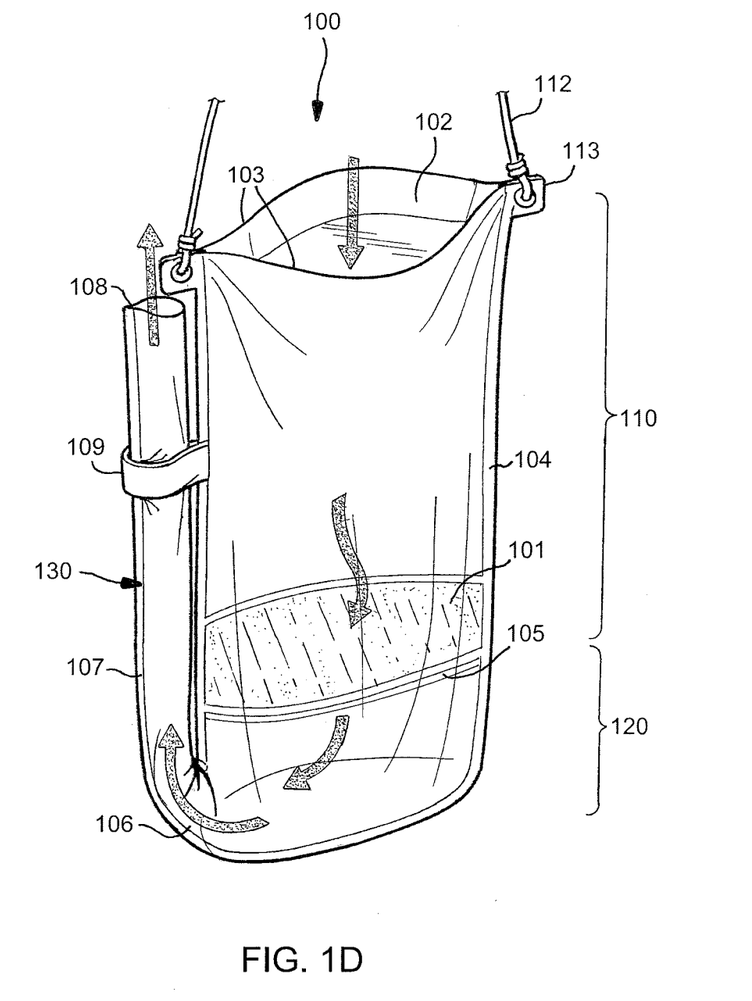
FIG. 1D illustrates a perspective view of a filled filtration device in accordance with one or more aspects of the present disclosure.
Figure 1E:
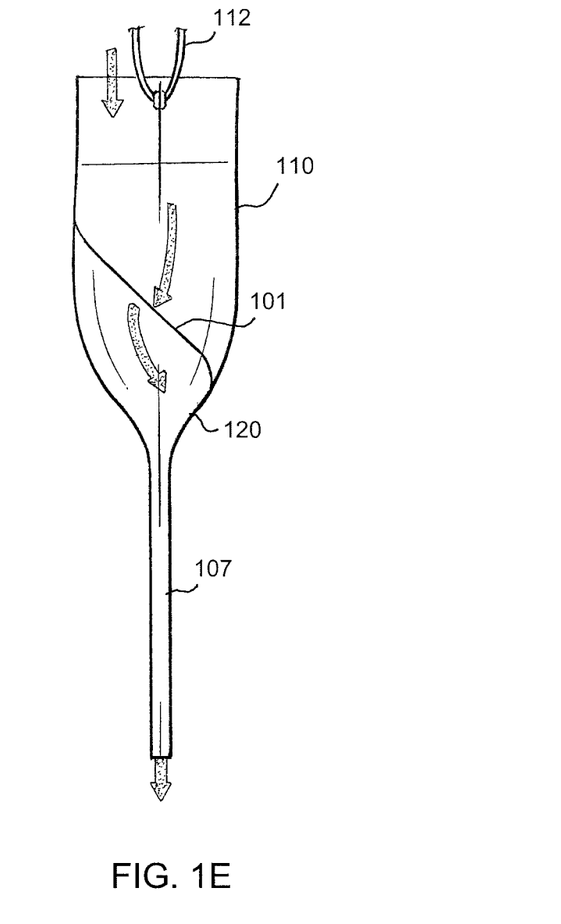
FIG. 1E illustrates a side view of the filled filtration device in accordance with one or more aspects of the present disclosure.

FIGS. 1C, 1D, and 1E illustrate the filtration device 100 in the operating position according to one or more aspects of the disclosure.

For example, FIG. 1C illustrates a side view of the filtration device 100. In this example, the sidewalls 103 of the filtration device 100 are opened and configured to receive fluid into the first chamber 110. By way of example only, an angle 149 is formed between the filter 101 and a sidewall of the holding portion, and as the opening 102 of the sidewalls 103 increases, the angle 149 may also increase. Stated differently, in this example, the filter 101 may have an axis that corresponds to an edge of the filter 101 and the axis may be coplanar to the planar surface of the filter. In this regard, the filter 101 may rotate about that axis such that an angle is created between the planar surface of the filter 101 and one of the sidewalls 103 of the filtration device 100. The angle may include a range from 0 to 90 degrees, or particularly a range from 5 to 75 degrees. It should be understood that the filter 101 may be configured to filter fluid also at very small, negligible angles.

FIGS. 1D and 1E illustrate the filtration device 100 already having received fluid into the first chamber 110. As indicated by the arrows in FIG. 1D, the fluid may be passed through the filter 101 from the first chamber 110 and filtrate is then collected in the second chamber 120. The dispensing portion 130 allows the filtrate to exit from the outlet 106 of the second chamber 120. In the example illustrated in FIG. 1D, the dispensing portion 130 is held upward along the sidewalls 103 of the filtration device 100 by the connector 109. In this regard, the filtrate does not spill out of the dispensing portion 130 as the filtration device 100 is being carried or filled by a user. To dispense the filtrate, the dispensing portion 130 would simply be decoupled from the connector 109, similar to the configuration of the dispensing portion 130 shown in FIGS. 1B and 1E.

FIG. 1E illustrates a side view of the filtration device 100 in the operating position with fluid being filtered through the filter 101. In this example, the filter 101 is disposed and arranged between the opposed sidewalls 103 and divides the holding portion of the filtration device 100 into the first chamber 110 and the second chamber 120. The dispensing portion 130 is configured to the holding portion as one continuous component of the filtration device 100. As shown and discussed above, the lateral axis of the filter 101 is positioned between the opposed sidewalls 103 such that it forms an angle relative to each of the sidewalls 103. As such, the planar surface of the filter 101 forms a slope with a particular slope value. Moreover, the connections between the filter 101 and the sidewalls 103 are elastic and/or flexible, which allows the sidewalls 103 to open and "collapse" with the filter 101.

As discussed above, in the operating position, fluid is received at the top end of the holding portion and is funneled into the first chamber 110. The fluid then passes through the angled filter 101, as shown by the arrows, into the second chamber 120. The "fluid" collected in the second chamber 120 is clean filtrate. In some examples, at this point, helpful chemicals such as nutrients, e.g., oral rehydration salts, electrolyte mixes, etc. may be added to the filtrate collected in the second chamber 120. The dispensing portion 120 is configured to allow the filtrate to exit from the second chamber 120 to a location the user desires.

Collapsed Position

Referring back to FIG. 1B, a front view of the filtration device 100 is illustrated according to aspects of the disclosure. In this example, the dispensing portion 130 and the filtration device 100 form a single continuous unit. As shown, the filtration device is in a collapsed state and not filled with any fluid, and the filter has an edge 145 with a corresponding axis 146 and an edge 147 opposing the edge 145 with a corresponding axis 148. Because the filtration device is in the collapsed state, the planar surfaces corresponding to the top or bottom surfaces of the filter 101 face the planar surfaces corresponding to a respective sidewall of the holding portion. In that regard, the angle between the planar surface of the filter 101 and one of the sidewalls 103 may be approximately zero such that the filter and the sidewall are made approximately flat when in the collapsed position. As such, this configuration allows the filtration device 100 to have a flattened shape. FIG. 1B also shows that the holding portion may be rectangular in shape and the filter 101 may be disposed toward the bottom of the holding portion such that the first chamber 110 is greater in capacity than the second chamber 120.

Folded Position

Figure 1F:
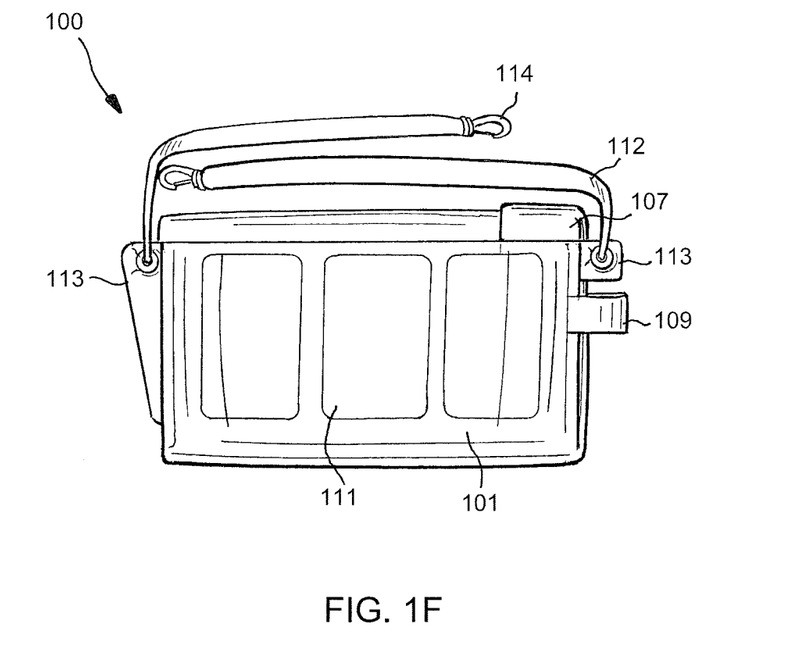
FIG. 1F illustrates a front view of an unfilled and folded filtration device in accordance with one or more aspects of the present disclosure.

FIG. 1F illustrates a front view of the filtration device 100 in a folded position. As shown in FIG. 1F, the first chamber and the second chamber (not shown) may be folded around the filter 101 to form a compact, space-efficient unit such that the filter 101 and the filter substrate 111 lie approximately in a central area, such as the middle, of the folded bag (for ease of transportation and handling). In this example, the tubular dispenser 107 may also be folded in for additional compactness. FIG. 1F also illustrates another example of supports for the filter 101, e.g., plastic strips across the front and/or back of the filter. In other examples, the support ties and/or strings 112 may be unhooked at a hook 114. In this regard, the filtration device 100 can be made even smaller and more compact by folding the filtration device 100 from the collapsed position to the folded position. It should be understood that the thickness of the support ties, strings, etc. are not limited to a certain thickness, and may encompass various thicknesses ranging from thin to thick.

Multiple Filters

Figure 2A:
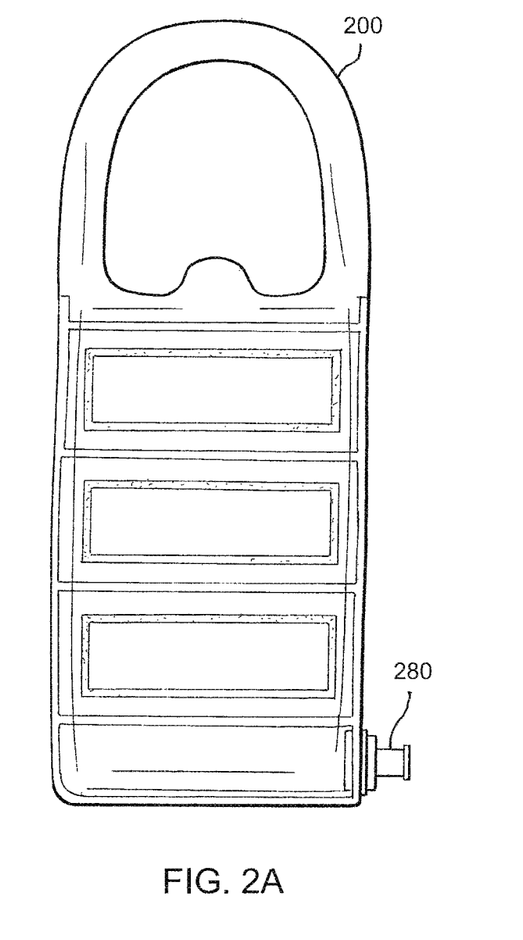
FIG. 2A illustrates a front view of a filtration device having more than one filter in accordance with one or more aspects of the present disclosure.
Figure 2B:
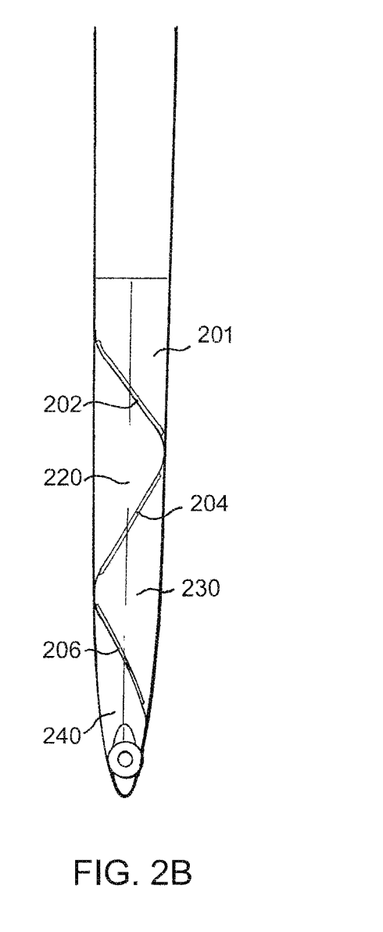
FIG. 2B illustrates a side view of the filtration device having more than one filter in accordance with one or more aspects of the present disclosure.

In a further aspect of the disclosure, the filtration device may implement more than one filter. FIGS. 2A and 2B illustrate a filtration device 200 having a holding portion, three separate filters 202, 204, 206, and a dispensing portion 280. In the operating position (when the filtration device is configured to receive fluid, such as dirty water), the three filters are configured to form a first chamber 201, a second chamber 220, a third chamber 230 and a fourth chamber 240, as shown in FIG. 2B. Moreover, the filters 202, 204, and 206 are also angled respect to the sidewalls of the holding portion. As such, the filtration device 200 implements a three level filtration process via the filters 202, 204, and 206. In the collapsed position, as shown in FIG. 2A, the lateral axes corresponding to each of the filters 202, 204, and 206 are positioned approximately parallel to the respective sidewall of the holding portion of the filtration device 200. As such, the filtration device may lie in a relatively flat manner. In the example of the filtration device 200 shown in FIGS. 2A and 2B, the dispensing portion 280 is a spout, which may be configured to open and allow filtrate to exit from the fourth chamber 240 or close to retain the filtrate in the fourth chamber 240.

Advantages

In view of the foregoing aspects, examples, and/or embodiments, the filtration device of the present disclosure is cost-effective, space-efficient, and safe. For example, the filtration device is cost-effective because it is made from cheap and affordable material. In yet another example, the filtration device is space-efficient because it is operated as a single and compact unit. When the device is not in use, it can be collapsed and then further folded into an even smaller, more compact unit during transport or while being shipped to a particular location, such as a natural disaster site. In a further example, the filtration device is safe because the device is operated as a single, compact unit without the need for long tubes and hoses used in the prior art microfiltration devices (which can allow contamination at the respective connection points). Moreover, the filtration device of the present disclosure does not require vertical head pressure to be operated. This is advantageous because some settings, such as recreational or refugee tents, do not allot sufficient space or the means to hang filtration component that create the vertical head pressure.

Other objects, advantages, and novel features of the present invention are apparent from the foregoing detailed description of the one or more preferred embodiments, examples and aspects. It should be recognized that the one or more examples in the disclosure are non-limiting examples and that the present invention is intended to encompass variations and equivalents of these examples.

The invention claimed is:

1. A filtration device, comprising:
a holding portion having a first flexible side and a second flexible side, the first and second flexible sides opposing each other, wherein the holding portion has a top end and a bottom end; and
a first filter having a first edge and a second edge opposing the first edge of the first filter, wherein the first edge of the first filter is attached to the first flexible side of the holding portion at a first position and the second edge of the first filter is attached to the second flexible side of the holding portion at a second position lower relative to the first position, a second filter having a third edge and a fourth edge opposing the third edge of the second filter, wherein the third edge of the second filter is attached to the second flexible side of the holding portion at a third position that is at or below the second position of the first filter and the fourth edge of the second filter is attached to the first flexible side of the holding portion at a fourth position lower relative to the third position, wherein the holding portion has a first holding part, a second holding part, and a third holding part, wherein the first holding part is above the first filter and is configured to hold fluid received from the top end of the holding portion, wherein the second holding part is below the first filter and above the second filter and is configured to hold filtrate corresponding to the fluid having passed through the first filter, and wherein the third holding part is below the second filter and is configured to hold second stage filtrate corresponding to the filtrate having passed through the second filter.

2. The filtration device of claim 1, further comprising a dispensing portion having a first end and a second end, wherein the first end of the dispensing portion is connected to the opening of the third holding part of the holding portion.

3. The filtration device of claim 2, wherein the dispensing portion is configured to dispense the filtrate from the second end of the dispensing portion.

4. The filtration device of claim 2, wherein the dispensing portion is a straw or a spout.

5. The filtration device of claim 1, wherein the holding portion is collapsible such that the first filter, the second filter, and the first and second flexible sides are approximately flat when the holding portion is collapsed.

6. The filtration device of claim 5, wherein the collapsed holding portion is configured to be folded.

7. The filtration device of claim 1, wherein one or more of the first filter and the second filter includes a plurality of metal particles.

8. The filtration device of claim 7, wherein the metal particles include one or more of: (i) silver particles, (ii) silver nanoparticles, (iii) copper particles, and (iv) copper nanoparticles.

9. The filtration device of claim 7, wherein the metal particles have an oligodynamic effect and are configured to reduce contamination in the fluid so that one or more of the filtrate and the second stage filtrate is safer than the fluid.

10. The filtration device of claim 1, wherein one or more of the first filter and the second filter includes one or more of: (i) a non-woven media, (ii) paper, (iii) felt, and (iv) a cloth.

11. The filtration device of claim 1, wherein the first holding part has a first volume, the second holding part has a second volume, and the third holding part has a third volume, the first volume being greater than one or more of the second volume and the third volume.

12. The filtration device of claim 1, further comprising one or more additional filters, in addition to the first and second filters, attached between the first and second flexible sides of the holding portion.

13. The filtration device of claim 1, wherein the dispensing portion is configured to extend approximately along an outside surface of one of the first and second flexible sides and secured in place by one or more of: (i) a connector, (ii) a securing component, and (iii) a clip.

14. The filtration device of claim 2, further comprising at least one seal configured to seal one or more of: (i) the top end of the holding portion, (ii) the bottom end of the holding portion, (iii) the opening of the third holding part of the holding portion, (iv) the first end of the dispensing portion, and (v) the second end of the dispensing portion.

15. The filtration device of claim 1, further comprising one or more of: (i) a support tie, (ii) a string, and (iii) a handle.

16. The filtration device of claim 1, wherein the holding portion is a single-piece of heat-sealed plastic or a tube.

17. A filtration device, comprising:

a holding portion having a first flexible side and a second flexible side, the first and second flexible sides opposing each other, wherein the holding portion has a top end and a bottom end; and a first filter having a first axis corresponding approximately to a first edge of the first filter and a second axis corresponding approximately to a second edge of the first filter opposing the first edge, wherein the first axis and the second axis are coplanar with a planar surface of the first filter, wherein the first edge of the first filter is attached to the first flexible side of the holding portion at a first position and the second edge of the first filter is attached to the second flexible side of the holding portion at a second position lower relative to the first position, a second filter having a third axis corresponding approximately to a third edge of the second filter and a fourth axis corresponding approximately to a fourth edge of the second filter opposing the third edge, wherein the third axis and the fourth axis are coplanar with a planar surface of the second filter, wherein the third edge of the second filter is attached to the second flexible side of the holding portion at a third position that is at or below the second position of the first filter and the fourth edge of the second filter is attached to the first flexible side of the holding portion at a fourth position lower relative to the third position, wherein the filtration device is configured to be in an operating position or in a collapsed position, wherein the operating position configures:

the first filter to move about the first axis in a first direction and the first filter to move about the second axis in a second direction approximately opposite to the first direction, the second filter to move about the third axis in approximately the second direction and the second filter to move about the fourth axis in approximately the first direction, wherein the holding portion has a first holding part, a second holding part, and a third holding part, wherein the first holding part is above the first filter and is configured to hold fluid received from the top end of the holding portion, wherein the second holding part is below the first filter and above the second filter and is configured to hold filtrate corresponding to the fluid having passed through the first filter, and wherein the third holding part is below the second filter and is configured to hold second stage filtrate corresponding to the filtrate having passed through the second filter, and wherein the second stage filtrate is configured to exit from an opening of the third holding part of the holding portion, and wherein the collapsed position configures:
the first filter, the second filter, and the first and second flexible sides to be approximately flat.

18. The filtration device of claim 1, wherein one or more of the first filter and the second filter is replaceable or removable.

19. The filtration device of claim 1, wherein one or more of the first filter and the second filter has one or more peelable filter layers, each peelable filter layer configured to be peeled when clogged.

20. The filtration device of claim 1, wherein one or more of the first filter and the second filter includes granular filtration media having a plurality of carbon particles.

21. The filtration device of claim 15, wherein the handle is part of the holding portion.

22. The filtration device of claim 1, wherein one or more of the first filter and the second filter includes a filter backing system, the filter backing system including one or more of: (i) a webbing and (ii) a mesh.

23. The filtration device of claim 1, wherein the first and second flexible sides have varying degrees of flexibility based at least in part on temperature.

24. The filtration device of claim 1, wherein the second stage filtrate is configured to exit from an opening of the third holding part of the holding portion.

25. The filtration device of claim 1, further comprising:
a third filter having a fifth edge and a sixth axis opposing the fifth edge of the third filter, wherein the fifth edge of the third filter is attached to the first flexible side of the holding portion at a fifth position that is at or below the fourth position of the second filter and the sixth edge of the third filter is attached to the second flexible side of the holding portion at a sixth position lower relative to the fifth position,
wherein the holding portion further has a fourth holding part, wherein the fourth holding portion is below the third filter and is configured to hold third stage filtrate corresponding to the second stage filtrate having passed through the third filter, and wherein the third stage filtrate is configured to exit from an opening of the fourth holding part of the holding portion.

26. The filtration device of claim 17, wherein the first filter creates a first angle between the planar surface of the first filter and one of the first and second flexible sides when moved, and the second filter creates a second angle between the planar surface of the second filter and one of the first and second flexible sides when moved, wherein the first angle and the second angle has a range from 0 degrees to less than 90 degrees.

* * * * *